US007821728B2

(12) United States Patent
Fry et al.

(10) Patent No.: US 7,821,728 B2
(45) Date of Patent: Oct. 26, 2010

(54) DETECTION OF DEFECTIVE TAPE DRIVE BY AGGREGATING READ ERROR STATISTICS

(75) Inventors: Scott Milton Fry, Oro Valley, AZ (US); Hiroshi Itagaki, Kanagawa-ken (JP); James Mitchell Karp, Tucson, AZ (US); Takashi Katagiri, Kanagawa-ken (JP); Pamela Ruth Nylander-Hill, Tucson, AZ (US); Yutaka Ooishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/172,098

(22) Filed: Jul. 11, 2008

(65) Prior Publication Data

US 2010/0007978 A1    Jan. 14, 2010

(51) Int. Cl.
*G11B 27/36* (2006.01)
*G11B 5/09* (2006.01)

(52) U.S. Cl. .......................................... 360/31; 360/53
(58) Field of Classification Search .................. 360/31, 360/53
See application file for complete search history.

(56) References Cited

U.S. PATENT DOCUMENTS

| | | | |
|---|---|---|---|
| 6,026,468 A | | 2/2000 | Mase et al. |
| 7,064,913 B2 * | | 6/2006 | Gunderson et al. ............ 360/31 |
| 7,206,151 B2 * | | 4/2007 | Kimura et al. ............... 360/53 |
| 7,301,718 B2 * | | 11/2007 | Ballard ........................ 360/69 |
| 7,363,546 B2 * | | 4/2008 | Duncan ........................ 714/40 |
| 7,626,778 B2 * | | 12/2009 | Evans ........................ 360/72.2 |
| 2006/0126211 A1 | | 6/2006 | Sasaki |
| 2006/0253729 A1 | | 11/2006 | Beeston |
| 2007/0041113 A1 | | 2/2007 | Mojica |

FOREIGN PATENT DOCUMENTS

| | | |
|---|---|---|
| JP | 04-149866 | 5/1992 |
| JP | 05-081786 | 4/1993 |

OTHER PUBLICATIONS

Patent Abstract and English machine translation of JP 05-081786 published Apr. 2, 1993.
Patent Abstract of JP 04-149866 published May 22, 1992.
Allen, "Detect Read/Write Failures Earlier-Avoid Permanent Read Errors", IBM Technical Disclosure Bulletin vol. 37, No. 10, Oct. 1994. pp. 161-164.

* cited by examiner

*Primary Examiner*—Daniell L Negrón
*Assistant Examiner*—Regina N Holder
(74) *Attorney, Agent, or Firm*—Rabindranath Dutta; Konrad Raynes & Victor LLP (57) ABSTRACT

A plurality of tape drives writes a plurality of indicators corresponding to a plurality of data units on a tape, wherein an indicator indicates which tape drive of the plurality of tape drives has written a corresponding data unit on the tape. Each of the plurality of tape drives generates an extent of read errors, in response to reading the plurality of data units written on the tape. The extent of read errors generated by each of the plurality of tape drives are aggregated at a computational device coupled to the plurality of tape drives. A determination is made at the computational device of a defective tape drive of the plurality of tape drives from the aggregated extent of read errors.

20 Claims, 7 Drawing Sheets

DETECTION OF DEFECTIVE TAPE DRIVE BY AGGREGATING READ ERROR STATISTICS

BACKGROUND

1. Field

The disclosure relates to a method, system, and article of manufacture for the detection of a defective tape drive by aggregating read error statistics.

2. Background

A defective tape drive may sometimes write data with bad quality on a tape, and it may be difficult for other tape drives to read the data written by this defective tape drive. Even though the defective tape drive may read back the data while the tape drive is writing to the tape, and may also verify the data written to the tape, it is sometimes difficult for the other drives to read the data.

For example, the angle of write/read head may be very different from the format specification in the other tape drives. In this case, it is easy for the writing drive to read the data written to the tape by the writing drive by itself However for the other tape drives, the data may be written in a way such that it is difficult to read the data. As a result, one defective tape drive may cause a lot of read errors on a plurality of tapes that are read by a plurality of tape drives.

SUMMARY OF THE PREFERRED EMBODIMENTS

Provided are a method, system, and article of manufacture, wherein a plurality of tape drives writes a plurality of indicators corresponding to a plurality of data units on a tape, wherein an indicator indicates which tape drive of the plurality of tape drives has written a corresponding data unit on the tape. Each of the plurality of tape drives generates an extent of read errors, in response to reading the plurality of data units written on the tape. The extent of read errors generated by each of the plurality of tape drives are aggregated at a computational device coupled to the plurality of tape drives. A determination is made at the computational device of a defective tape drive of the plurality of tape drives from the aggregated extent of read errors.

In additional embodiments, the determining of the defective tape drive is performed by: (a) maintaining a threshold at the computational device; (b) determining, at the computational device, whether the aggregated extent of read errors exceeds the threshold for a selected tape drive of the plurality of tape drives; and (c) determining, that the selected tape drive is the defective tape drive, if the aggregated extent of read errors exceeds the threshold for the selected tape drive.

In further embodiments, the threshold for the selected tape drive is a measure of a quality of writing performed by the selected tape drive, and the extent of read errors is a function of at least an amount of error correction that is performed for reading data units from the tape and a number of data units that cannot be read from the tape.

In yet further embodiments, the computational device normalizes the extent of read errors per tape drive that writes data units and weighs the extent of read errors by a number of data units read.

In still further embodiments, the aggregated extent of read errors for a selected tape drive of the plurality of tape drives is a sum of a writing quality of the selected drive as determined by each of the tape drives of the plurality of tape drives.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
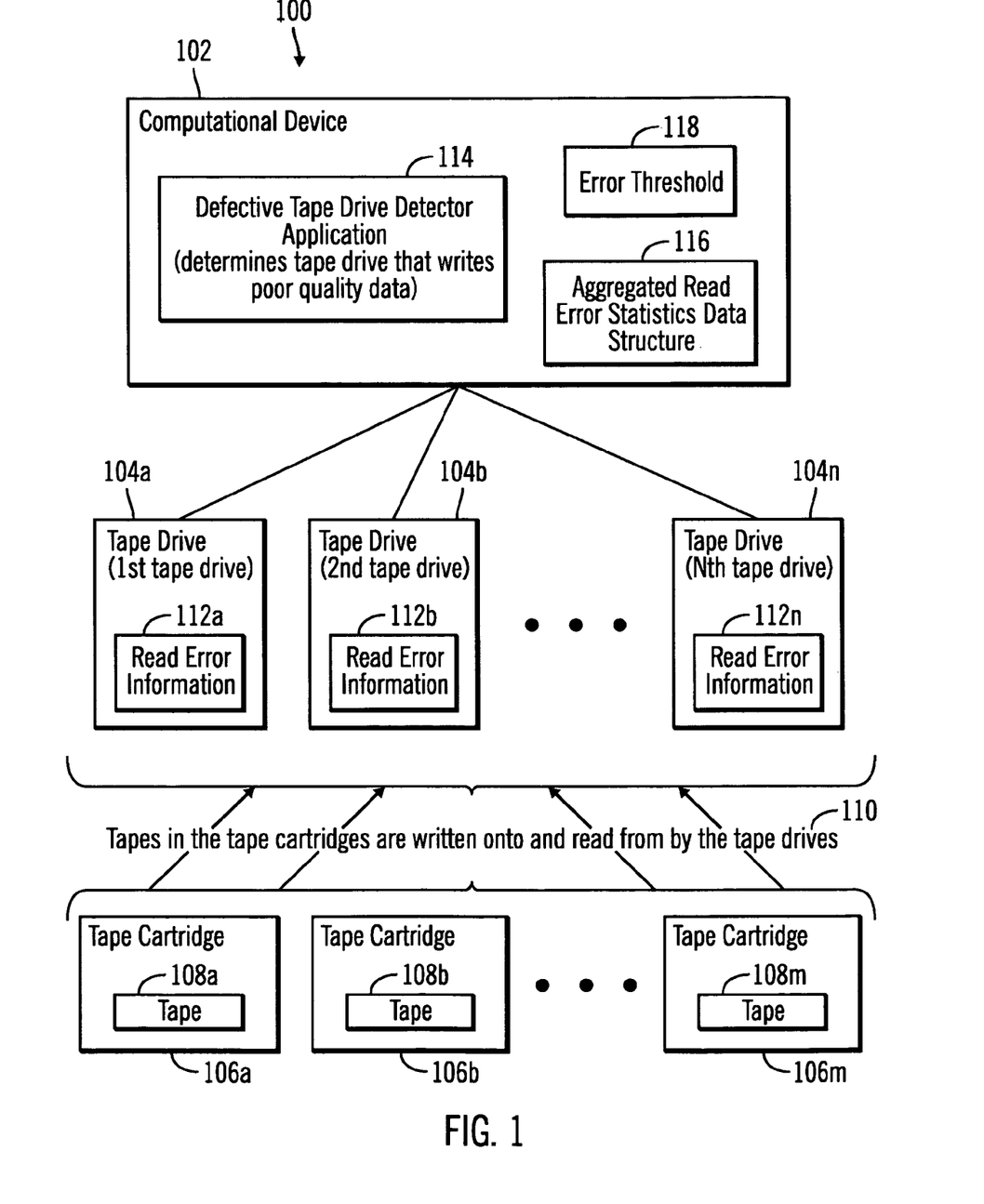
FIG. 1 illustrates a block diagram of a computing environment in which a computational device is coupled to a plurality of tape drives, in accordance with certain embodiments.

FIG. 1 illustrates a block diagram of a computing environment 100 in which a computational device 102 is coupled to a plurality of tape drives 104*a*,104*b*, . . . 104*n*, in accordance with certain embodiments. The computational device 102 may be any suitable computational device known in the art, such as, a personal computer, a mainframe computer, a midrange computer, a storage controller, a library manager, a telephony device, a handheld computer, etc. The plurality of tape drives 104*a*. . . 104*n* may be operable with a plurality of tape cartridges 106*a*, 106*b*, . . . 106*m* that may be inserted into receptacles included in the plurality of tape drives 104*a* . . . 104*n*, wherein the tape cartridges 106*a* . . . 106*m* include tapes 108*a*, 108*b*, . . . 108*m*. For example, in one embodiment the tape cartridge 106*a* that includes tape 108*a* may be inserted into the tape drive 104*a*. The tape drives 104*a* . . . 104*n* may read or write data with respect to the tapes 108*a* . . . 108*m*. FIG. 1 shows (reference numeral 110) that the tapes 108*a* . . . 108*m* in the tape cartridges 106*a* . . . 106*m* may be written onto and read from in the tape drives 104*a* . . . 104*n*.

In certain embodiments, a tape drive that writes data on a tape may be defective and may write data of an inferior quality, wherein the written data may be difficult to read for other tape drives. For example, tape drive 104*a* may write data on tape 108*a* included the tape cartridge 106*a*. When the tape cartridge 106*a* with tape 108*a* is inserted into tape drive 104*b*, the tape drive 104*b* may find it difficult to read the data if the tape drive 104*a* is defective. In certain embodiments, the tape drive 104*b* may have to perform a large number or error correction operations to read the data, In other embodiments, the tape drive 104*b* may be unable to read the data even after performing error corrections. Tape drive 104*a* that has written the data is generally able to read the data.

In certain embodiments, each of the tape drives 104*a* . . . 104*n* allow the reporting of information of read error to the computational device 102, wherein data structures referred to as the read error information 112a, 112b, . . . 112n store the information on the read errors.

The computational device 102 includes a defective tape drive detector application 114 and data structures referred to as an aggregated read error statistics data structure 116 and an error threshold 118. The aggregated read error statistics data structure 116 is generated by accumulating and analyzing the read error information 112a . . . 112n generated by the tape drives 104a . . . 104n. The defective tape drive detector application 114 uses the aggregated read error statistics data structure 116 to determine whether the read errors caused by a selected tape drive exceed the error threshold 118. If so, the selected tape drive is a defective tape drive that should be replaced.

Figure 2:
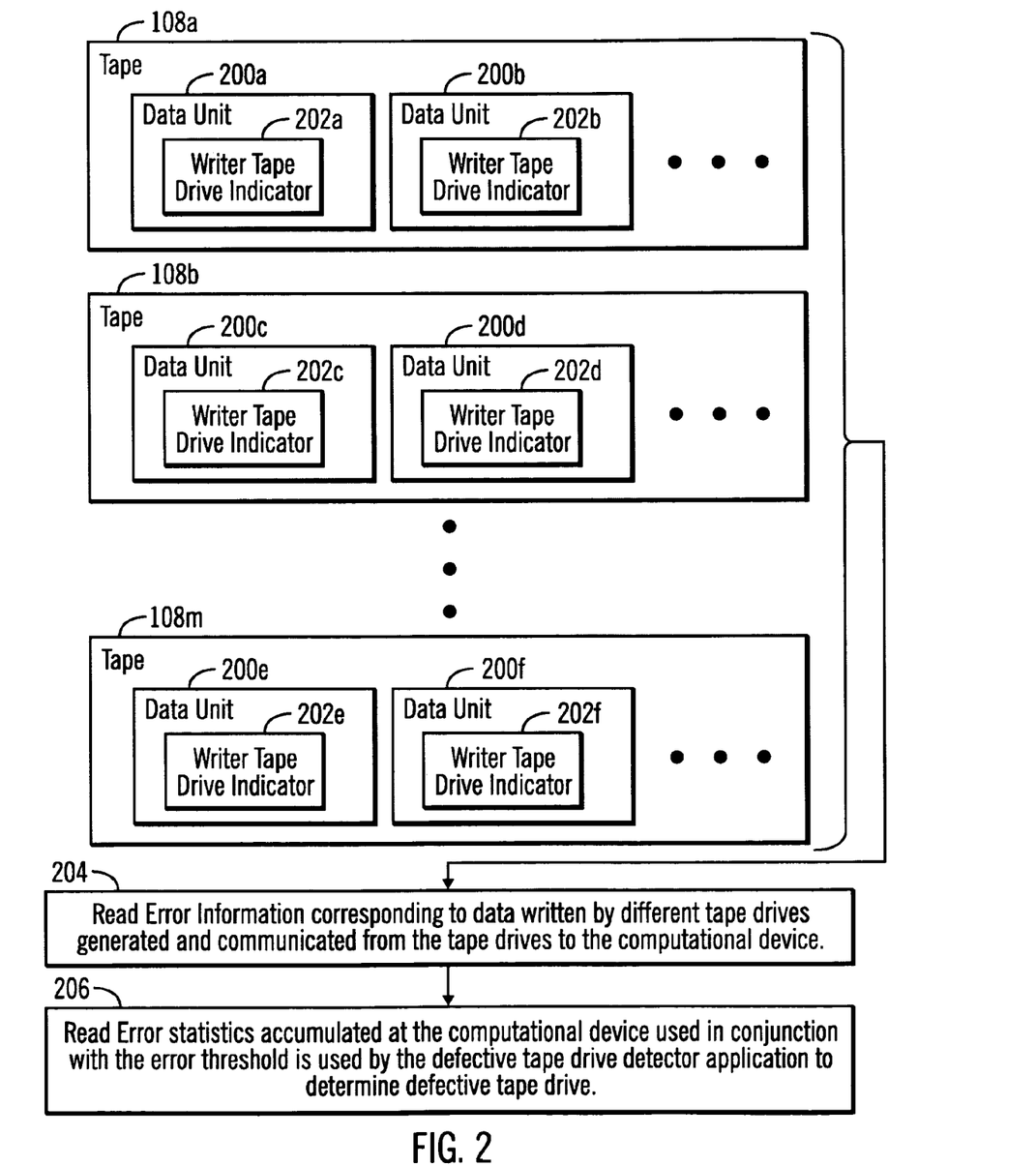
FIG. 2 shows a block diagram of data units written on a plurality of tapes and the accumulation of error statistics, in accordance with certain embodiments.

FIG. 2 shows a block diagram of data units 200a, 200b, 200c, 200d, 200e, 200f written on a plurality of tapes 108a, 108b, . . . 108m and the accumulation of error statistics, in accordance with certain embodiments.

When a data unit, such as a dataset, a block, a record, a logical unit, etc., is written onto a tape by a tape drive, the tape drive also writes an indication of the identity of the tape drive that wrote the data in the indicator referred to as the writer tape drive indicator. For example, if tape drive 104a writes the data unit 200a onto tape 108a then the tape drive 104a stores the identity of the tape drive 104a in the writer tape drive indicator 202a. Subsequently, if tape drive 104b writes the data unit 200b onto tape 108a then the tape drive 104b stores the identity of the tape drive 104b in the writer tape drive indicator 202b. A plurality of writer tape drive indicators 202a, 202b, 202c, 202d, 202e, 202f are shown in FIG. 2.

When the tapes 108a . . . 108m are read by the tape drives 104a . . . 104n read errors may be generated, and the generated read error information 112a . . . 112n corresponding to the data written by different tape drives 104a . . . 104n are generated and communicated (reference numeral 204) from the tape drives 104a . . . 104n to the computational device 102. The defective tape drive detector application 114 accumulates the read error statistics at the computational device 102 in the aggregated read error statistics data structure 116 and this is used in conjunction with the error threshold 118 to determine the defective tape drives.

Figure 3:
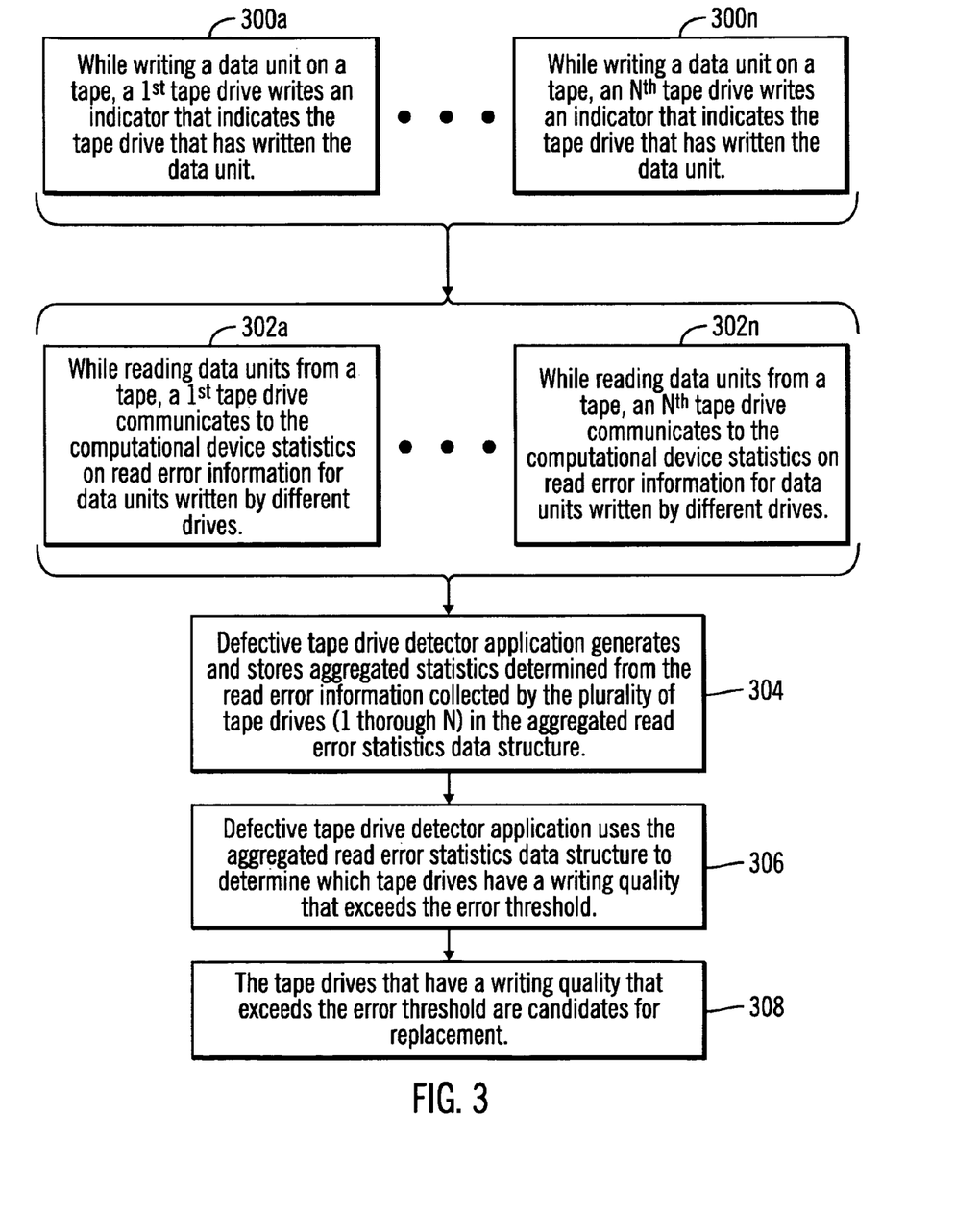
FIG. 3 illustrates a flowchart that shows first operations performed by a computational derive and the plurality of tape drives, in accordance with certain embodiments.

FIG. 3 illustrates a flowchart that shows first operations performed by the computational derive 102 and the plurality of tape drives 104a . . . 104n, in accordance with certain embodiments.

Control starts at blocks 300a . . . 300n that may be performed in parallel, wherein in exemplary blocks 300a . . . 300n while writing a data unit on a tape, a tape drive, such as any of the plurality of tape drives 104a . . . 104n, writes an indicator (e.g., indicator 202a) that indicates the tape drive that has written the data unit. Control proceeds to blocks 302a . . . 302n that may also be performed in parallel, wherein in blocks 302a . . . 302n while reading data units from a tape, a tape drive, such as any of the plurality of tape drives 104a . . . 104n, communicates to the computational device 102 statistics on read error information for data units written by different drives.

Control proceeds to block 304, where the defective tape drive detector application 114 generates and stores aggregated statistics determined from the read error information 112a . . . 112n collected by the plurality of tape drives (labeled 1 thorough N in FIG. 1 with reference numerals 104a . . . 104n) in the aggregated read error statistics data structure 118.

The defective tape drive detector application 114 uses (at block 306) the aggregated read error statistics data structure 118 to determine which tape drives have a writing quality that exceeds the error threshold 118 (i.e., the quality of writing is so poor that the error threshold is exceeded). Control proceeds to block 308, in which the tape drives that have a writing quality that exceeds the error threshold are candidates for replacement as data written by these tape drives cause significant read errors when the data is read by the plurality of tape drives 104a . . . 104n.

Figure 4:
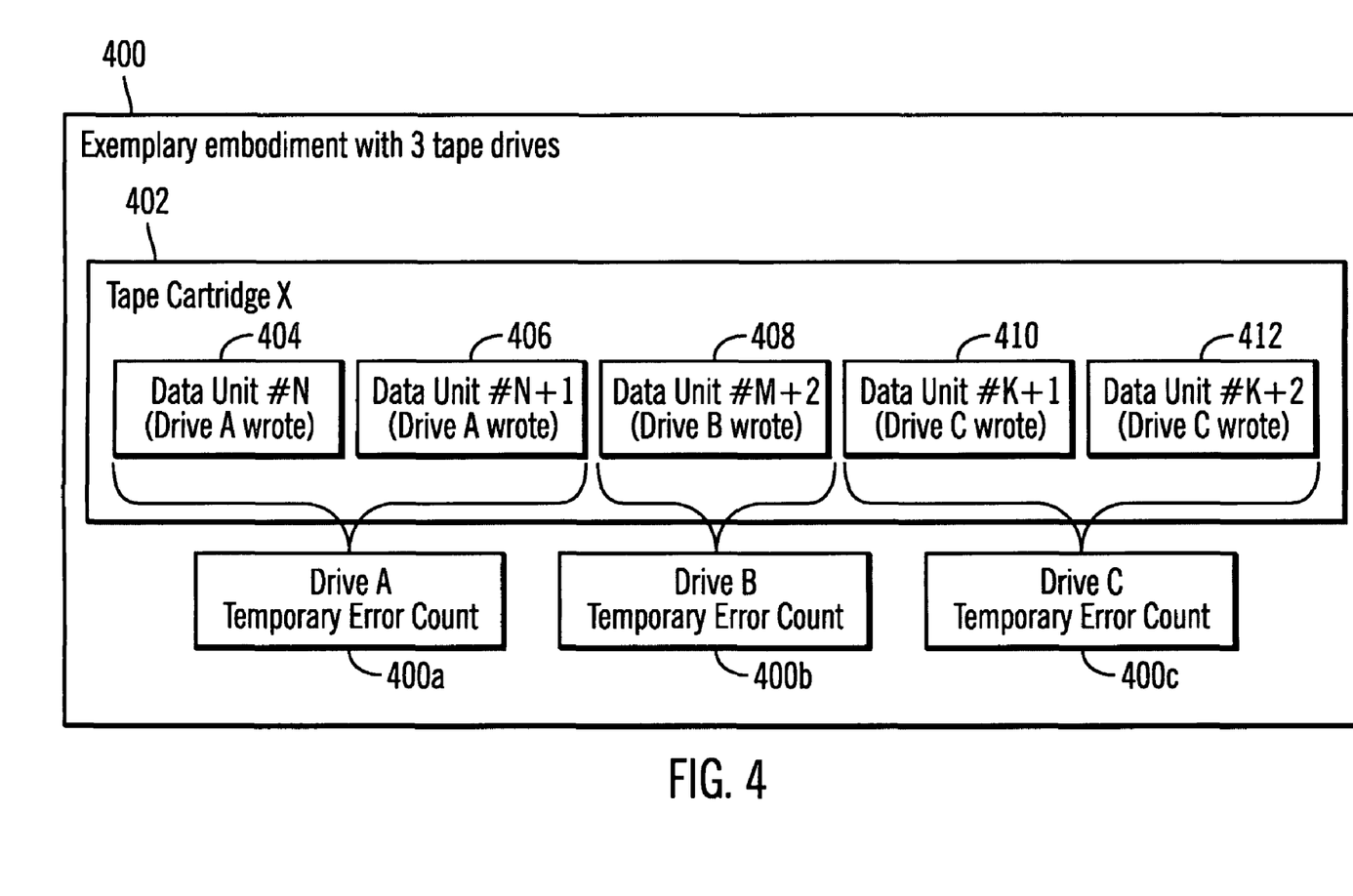
FIG. 4 illustrates an exemplary embodiment with three tape drives, in accordance with certain embodiments.

FIG. 4 illustrates an exemplary embodiment 400 with three tape drives 400a, 400b, 400c in accordance with certain embodiments. The tape drives 400a. 400b, 400c write data units on a tape included in the tape cartridge 402. Tape drive A (reference numeral 400a) writes the data unit "#N" 404 and data unit "#N+1" 406, tape drive B (reference numeral 400b) writes the data unit "#M+2" 408, and tape drive C (reference numeral 400c) writes the data unit "#K+1" 410 and data unit "K+2" 412. Therefore, in FIG. 4, each of the three tape drives 400a, 400b, 400c write one or more data units on the tape included in the tape cartridge 402. Each data unit also stores in association with the data unit the identity of the tape drive that writes the data unit.

Figure 5:
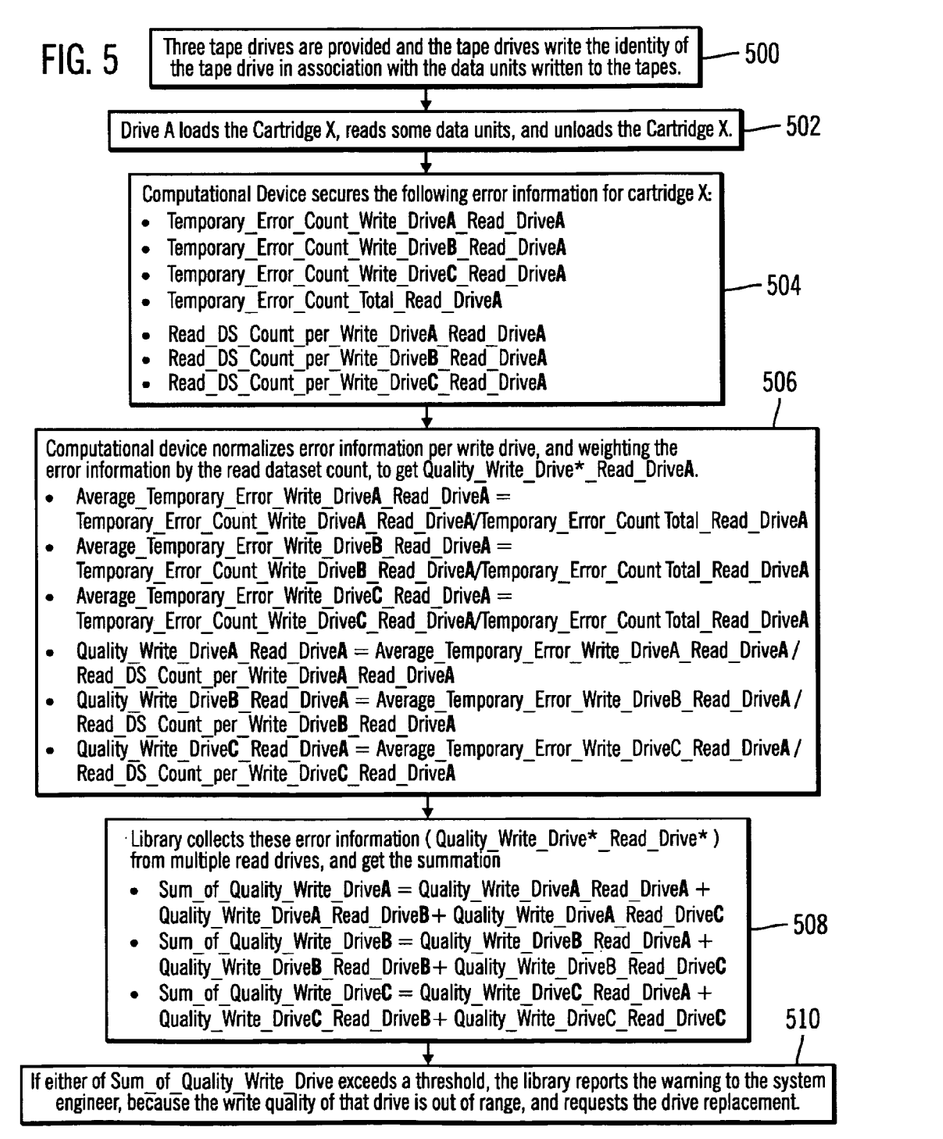
FIG. 5 illustrates a flowchart that shows second operations performed in the exemplary embodiment with three tape drives, in accordance with certain embodiments.

FIG. 5 illustrates a flowchart that shows second operations performed in the exemplary embodiment of FIG. 4 with three tape drives 400a, 400b, 400c, in accordance with certain embodiments.

Control starts at block 500, in which three tape drives 400a, 400b, 400c are provided and the tape drives 400a, 400b, 400c write the identity of the tape drive in association with the data units written to the tapes. The tape drives are referred to as Drive A 400a, Drive B 400b, Drive C 400c.

Control proceeds to block 502, in which the Drive A 400a loads the tape cartridge X 402, read some data units, and unloads the tape cartridge X 402. Then computational device 102 may issue log sense commands to the Drive A 400a, and computational device secures (at block 504) the following error information for tape cartridge X 402:

Temporary_Error_Count_Write_DriveA_Read_DriveA
Temporary_Error_Count_Write_DriveB_Read_DriveA
Temporary_Error_Count_Write_DriveC_Read_DriveA
Temporary_Error_Count_Total_Read DriveA
Read_DS_Count_per_Write_DriveA_Read_DriveA
Read_DS_Count_per_Write_DriveB_Read_DriveA
Read_DS_Count_per_Write_DriveC_Read_DriveA The Temporary_Error_Count_Write_DriveA_Read_DriveA is a measure of the read errors generated when data written by Drive A is read by Drive A. The Temporary_Error_Count_Write_DriveA_Read_DriveB is a measure of the read errors generated when data written by Drive A is read by Drive B. In the nomenclature, "Result_Write_Drive_i_Read_Drive_j" corresponds to the result (e.g., Temporary_Error_Count) obtained when "Drive j" reads the data written by "Drive i", where i and j can be A, B, or C.

The Temporary_Error_Count_Total_Read_DriveA is the sum of;
(i) Temporary_Error_Count_Write_DriveA_Read_DriveA,
(ii) Temporary_Error_Count_Write_DriveB_Read_DriveA; and
(iii) Temporary_Error_Count_Write_DriveC_Read_DriveA.

The DS_Count refers to dataset count which is the number of data units.

Then the computational device 102 normalizes error information per write drive, and weights the error information by the read dataset count, and secures Quality_Write_Drive*_Read_DriveA by computing (at block 506):

Average_Temporary_Error_Write_DriveA_Read_DriveA =Temporary_Error_Count_Write_DriveA_Read_DriveA/Temporary_Error_Count Total_Read_DriveA Average_Temporary_Error_Write_DriveB_Read_Drive A = Temporary_Error_Count_Write_DriveB_Read_DriveA/Temporary_Error_Count Total_Read_DriveA Average_Temporary_Error_Write_DriveC_Read_Drive A = Temporary_Error_Count_Write_DriveC_Read_DriveA/Temporary_Error_Count Total_Read_DriveA Quality_Write_DriveA_Read_DriveA=Average_ Temporary_ Error_Write_DriveA_Read_DriveA/Read_DS_Count_per_Write_DriveA_Read_DriveA Quality_Write_DriveB_Read_DriveA=Average_ Temporary_ Error_Write_DriveB_Read_DriveA/Read_DS_Count_pe r_Write_DriveB_Read_DriveA Quality_Write_DriveC_Read_DriveA=Average_ Temporary_Error_Write_DriveC_Read_DriveA/Read_DS_Count_per_Write_DriveC_Read_DriveA The computational device 102 collects these error information from multiple read drives, and computes the summation (at block 508):

Sum_of_Quality_Write_DriveA=Quality_Write_DriveA_ Read_DriveA+Quality_Write_DriveA_Read_DriveB+ Quality_Write_DriveA_Read_DriveC Sum_of_Quality_Write_DriveB=Quality_Write_DriveB_ Read_DriveA+Quality_Write_DriveB_Read_DriveB+ Quality_Write_DriveB_Read_DriveC Sum_of_Quality_Write_DriveC=Quality_Write_DriveC_ Read_DriveA+Quality_Write_DriveC_Read_DriveB+ Quality_Write_DriveC_Read_DriveC If either of Sum_of_Quality_Write_Drive exceeds a threshold 118, the computational device 102 reports a defective tape drive, because the write quality of the defective tape drive is out of range.

In certain embodiments, if the read quality of drive A itself is bad, all of Temporary_Error_Count_Write_Drive*_Read_DriveA will be bad, where Drive* refers to Drives A, B. or C. However, because of the normalization read quality of Drive A does not impact the detection of bad write drive.

If DriveA encounters a burst of temporary errors (not read so many datasets, but got a lot of temporary errors), Average_Temporary_Error_Write_Drive*_Read DriveA will be large value. However, certain exemplary embodiments calculate Quality_Write_Drive*_Read_DriveA by dividing by the total read dataset count, so the burst of temporary errors do not impact the detection of bad write drive.

Figure 6:
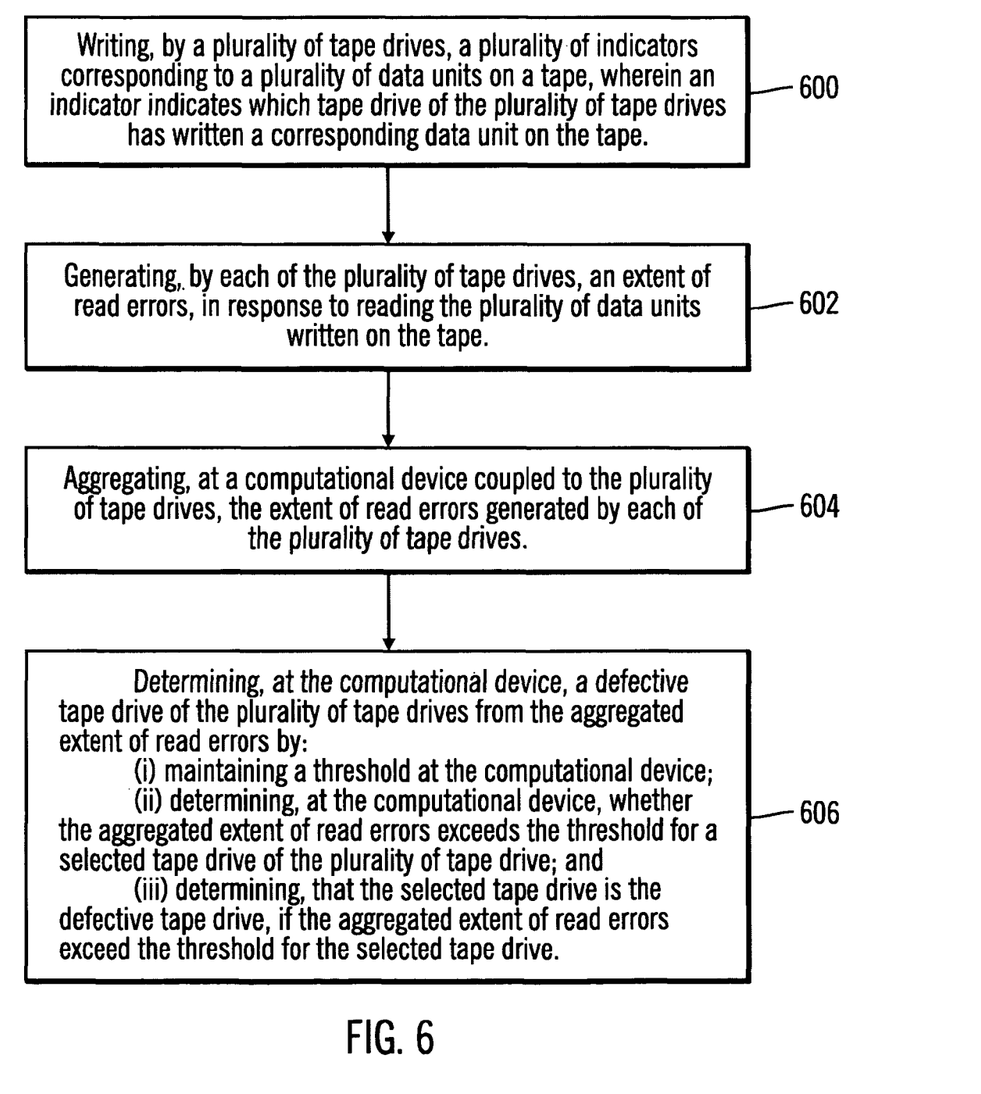
FIG. 6 illustrates a flowchart that shows third operations, in accordance with certain embodiments.

FIG. 6 illustrates a flowchart that shows third operations, in accordance with certain embodiments. The operations illustrated in FIG. 6 may be implemented in the computational device 102 and the tape drives 104a . . . 104n.

Control starts at block 600, in which a plurality of tape drives 104a . . . 104n write a plurality of indicators 202a, 202b, 202c, 202d, 202e, 202f corresponding to a plurality of data units 200a, 200b, 200c, 200d, 200e, 200f on a tape, wherein an indicator indicates which tape drive of the plurality of tape drives has written a corresponding data unit on the tape.

Control proceeds to block 602, wherein each of the plurality of tape drives generates an extent of read errors (indicated in certain embodiments in the read error information 112a . . . 112n), in response to reading the plurality of data units written on the tape.

The computational device 102 coupled to the plurality of tape drives 104a . . . 104n aggregates (at block 604) the extent of read errors generated by each of the plurality of tape drives 104a . . . 104n.

The computational device 102 determines (at block 606) a defective tape drive of the plurality of tape drives from the aggregated extent of read errors by: (i) maintaining a threshold 118 at the computational device 102; (ii) determining, at the computational device 102 whether the aggregated extent of read errors 116 exceeds the threshold 118 for a selected tape drive of the plurality of tape drive 104a . . . 104n; and (iii) determining, that the selected tape drive is the defective tape drive, if the aggregated extent of read errors 116 exceed the threshold 118 for the selected tape drive.

Therefore, certain embodiments may detect a defective write drive in a tape library, such as a computational device, and replace the defective drive when the defective drive writes a lot of poor quality data in a several tapes. In certain embodiments, when a drive reads the data, the drive checks which drive has written the data and collects the read error rate per write drive. This error information is reported to the tape library, and the tape library collects the error information from a lot of tape drives. If the tape library determines that the error rate exceeds a threshold, the tape library decides that the drive is defective and reports a warning. The defective tape drive can then be replaced.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
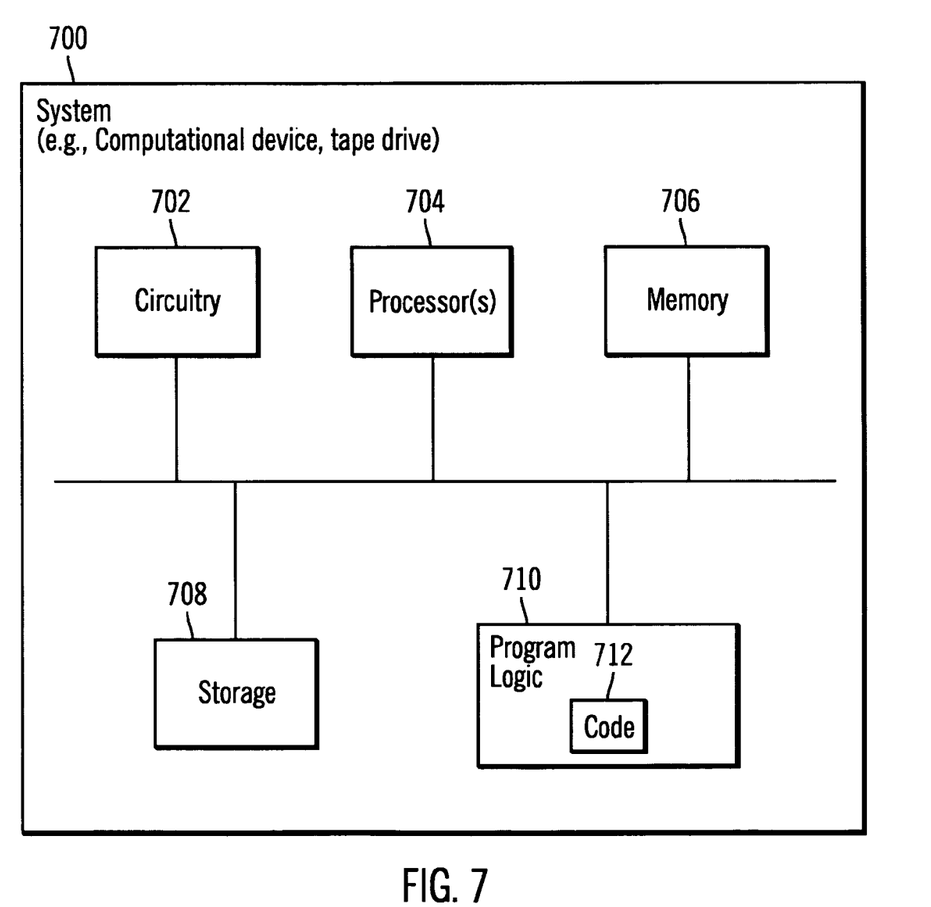
FIG. 7 illustrates a block diagram that shows certain elements that may be included in the computational device and the tape drives in the computing environment of FIG. 1, in accordance with certain embodiments.

FIG. 7 illustrates a block diagram that shows certain elements that may be included in the computational device 102 and the tape drives 104a . . . 104n in accordance with certain embodiments. One or more of the computational device 102 and the tape drives 104a . . . 104n, either individually or collectively may also be referred to as a system 700, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

writing, by a plurality of tape drives, a plurality of indicators corresponding to a plurality of data units on a tape, wherein an indicator indicates which tape drive of the plurality of tape drives has written a corresponding data unit on the tape;

generating, by each of the plurality of tape drives, an extent of read errors, in response to reading the plurality of data units written on the tape, wherein a first tape drive of the plurality of tape drives that writes selected data on the tape is able to read the selected data, and wherein at least a second tape drive of the plurality of tape drives generates a read error while reading the selected data written to the tape by the first tape drive;

aggregating, at a computational device coupled to the plurality of tape drives, the extent of read errors generated by each of the plurality of tape drives; and determining, at the computational device, a defective tape drive of the plurality of tape drives from the aggregated extent of read errors.

2. The method of claim 1, wherein the determining of the defective tape drive is performed by:

maintaining a threshold at the computational device;

determining, at the computational device, whether the aggregated extent of read errors exceeds the threshold for a selected tape drive of the plurality of tape drives; and determining, that the selected tape drive is the defective tape drive, if the aggregated extent of read errors exceeds the threshold for the selected tape drive.

3. The method of claim 2, wherein:

the threshold for the selected tape drive is a measure of a quality of writing performed by the selected tape drive; and the extent of read errors is a function of at least an amount of error correction that is performed for reading data units from the tape and a number of data units that cannot be read from the tape.

4. The method of claim 1, wherein the computational device normalizes the extent of read errors per tape drive that writes data units and weighs the extent of read errors by a number of data units read.

5. The method of claim 1, wherein the aggregated extent of read errors for a selected tape drive of the plurality of tape drives is a sum of a writing quality of the selected drive as determined by each of the tape drives of the plurality of tape drives.

6. A system, comprising:

a memory; and a processor coupled to the memory, wherein the processor performs operations, the operations comprising:

(i) writing, by a plurality of tape drives, a plurality of indicators corresponding to a plurality of data units on a tape, wherein an indicator indicates which tape drive of the plurality of tape drives has written a corresponding data unit on the tape;

(ii) generating, by each of the plurality of tape drives, an extent of read errors, in response to reading the plurality of data units written on the tape, wherein a first tape drive of the plurality of tape drives that writes selected data on the tape is able to read the selected data, and wherein at least a second tape drive of the plurality of tape drives generates a read error while reading the selected data written to the tape by the first tape drive;

(iii) aggregating, at a computational device coupled to the plurality of tape drives, the extent of read errors generated by each of the plurality of tape drives; and (iv) determining, at the computational device, a defective tape drive of the plurality of tape drives from the aggregated extent of read errors.

7. The system of claim 6, wherein the determining of the defective tape drive is performed by:

maintaining a threshold at the computational device;

determining, at the computational device, whether the aggregated extent of read errors exceeds the threshold for a selected tape drive of the plurality of tape drives; and determining, that the selected tape drive is the defective tape drive, if the aggregated extent of read errors exceeds the threshold for the selected tape drive.

8. The system of claim 7, wherein:

the threshold for the selected tape drive is a measure of a quality of writing performed by the selected tape drive; and the extent of read errors is a function of at least an amount of error correction that is performed for reading data units from the tape and a number of data units that cannot be read from the tape.

9. The system of claim 6, wherein the computational device normalizes the extent of read errors per tape drive that writes data units and weighs the extent of read errors by a number of data units read.

10. The system of claim 6, wherein the aggregated extent of read errors for a selected tape drive of the plurality of tape drives is a sum of a writing quality of the selected drive as determined by each of the tape drives of the plurality of tape drives.

11. A method for deploying computing infrastructure, comprising integrating computer-readable code into a computing system, wherein the code in combination with the computing system is capable of performing:

writing, by a plurality of tape drives, a plurality of indicators corresponding to a plurality of data units on a tape, wherein an indicator indicates which tape drive of the plurality of tape drives has written a corresponding data unit on the tape;

generating, by each of the plurality of tape drives, an extent of read errors, in response to reading the plurality of data units written on the tape, wherein a first tape drive of the plurality of tape drives that writes selected data on the tape is able to read the selected data, and wherein at least a second tape drive of the plurality of tape drives generates a read error while reading the selected data written to the tape by the first tape drive;

aggregating, at a computational device coupled to the plurality of tape drives, the extent of read errors generated by each of the plurality of tape drives; and determining, at the computational device, a defective tape drive of the plurality of tape drives from the aggregated extent of read errors.

12. The method for deploying computing infrastructure of claim 11, wherein the determining of the defective tape drive is performed by:

maintaining a threshold at the computational device;

determining, at the computational device, whether the aggregated extent of read errors exceeds the threshold for a selected tape drive of the plurality of tape drives; and determining, that the selected tape drive is the defective tape drive, if the aggregated extent of read errors exceeds the threshold for the selected tape drive.

13. The method for deploying computing infrastructure of claim 12, wherein:

the threshold for the selected tape drive is a measure of a quality of writing performed by the selected tape drive; and the extent of read errors is a function of at least an amount of error correction that is performed for reading data units from the tape and a number of data units that cannot be read from the tape.

14. The method for deploying computing infrastructure of claim 11, wherein the computational device normalizes the extent of read errors per tape drive that writes data units and weighs the extent of read errors by a number of data units read.

15. The method for deploying computing infrastructure of claim 11, wherein the aggregated extent of read errors for a selected tape drive of the plurality of tape drives is a sum of a writing quality of the selected drive as determined by each of the tape drives of the plurality of tape drives.

16. A system, comprising:
a plurality of tape drives; and
a computational device coupled to the plurality of tape drives, wherein the system performs operations, the operations comprising:
(i) writing, by a plurality of tape drives, a plurality of indicators corresponding to a plurality of data units on a tape, wherein an indicator indicates which tape drive of the plurality of tape drives has written a corresponding data unit on the tape;
(ii) generating, by each of the plurality of tape drives, an extent of read errors, in response to reading the plurality of data units written on the tape, wherein a first tape drive of the plurality of tape drives that writes selected data on the tape is able to read the selected data, and wherein at least a second tape drive of the plurality of tape drives generates a read error while reading the selected data written to the tape by the first tape drive;
(iii) aggregating, at a computational device coupled to the plurality of tape drives, the extent of read errors generated by each of the plurality of tape drives; and
(iv) determining, at the computational device, a defective tape drive of the plurality of tape drives from the aggregated extent of read errors.

17. The system of claim 16, wherein the determining of the defective tape drive is performed by:
maintaining a threshold at the computational device;
determining, at the computational device, whether the aggregated extent of read errors exceeds the threshold for a selected tape drive of the plurality of tape drives; and
determining, that the selected tape drive is the defective tape drive, if the aggregated extent of read errors exceeds the threshold for the selected tape drive.

18. The system of claim 17, wherein:
the threshold for the selected tape drive is a measure of a quality of writing performed by the selected tape drive; and
the extent of read errors is a function of at least an amount of error correction that is performed for reading data units from the tape and a number of data units that cannot be read from the tape.

19. The system of claim 16, wherein the computational device normalizes the extent of read errors per tape drive that writes data units and weighs the extent of read errors by a number of data units read.

20. The system of claim 16, wherein the aggregated extent of read errors for a selected tape drive of the plurality of tape drives is a sum of a writing quality of the selected drive as determined by each of the tape drives of the plurality of tape drives.

* * * * *